(12) United States Patent
Gubbi Lakshminarasimha et al.

(10) Patent No.: US 10,803,551 B2
(45) Date of Patent: Oct. 13, 2020

(54) METHOD AND SYSTEM FOR FRAME STITCHING BASED IMAGE CONSTRUCTION IN AN INDOOR ENVIRONMENT

(71) Applicant: Tata Consultancy Services Limited, Mumbai (IN)

(72) Inventors: Jayavardhana Rama Gubbi Lakshminarasimha, Bangalore (IN); Akshaya Ramaswamy, Bangalore (IN); Rishin Raj, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 76 days.

(21) Appl. No.: 16/267,245

(22) Filed: Feb. 4, 2019

(65) Prior Publication Data

US 2019/0333187 A1 Oct. 31, 2019

(30) Foreign Application Priority Data

Apr. 30, 2018 (IN) .............................. 201821016198

(51) Int. Cl.
*G06K 9/00* (2006.01)
*G06T 3/40* (2006.01)
*B64C 39/02* (2006.01)
*G06T 3/00* (2006.01)

(52) U.S. Cl.
CPC .......... *G06T 3/4038* (2013.01); *B64C 39/024* (2013.01); *G06T 3/0093* (2013.01); *B64C 2201/123* (2013.01); *B64C 2201/127* (2013.01)

(58) Field of Classification Search
CPC combination set(s) only.
See application file for complete search history.

(56) References Cited

U.S. PATENT DOCUMENTS

| 6,157,747 A * | 12/2000 | Szeliski | G06K 9/209 |
| | | | 345/419 |
| 2013/0215221 A1 | 8/2013 | Wang et al. | |

(Continued)

OTHER PUBLICATIONS

Yahyanejad, S. (Mar. 2013). *Orthorectified Mosaicking of Images from Small-Scale Unmanned Aerial Vehicles.* (Dissertation). Retrieved from https://ubdocs.aau.at/open/hssvoll/AC10774911.pdf.

*Primary Examiner* — Alex Kok S Liew
(74) *Attorney, Agent, or Firm* — Finnegan, Henderson, Farabow, Garrett & Dunner, LLP

(57) ABSTRACT

This disclosure relates generally to a method and a system for frame stitching based image construction for an indoor environment. The method enables constructing an image of a scene by stitching a plurality of key frames identified from a plurality of image frames captured by a mobile imaging device. The method overcomes multiple challenges posed by the indoor environment, effectively providing clean stitching of the key frames to construct the image of the scene. The method provides image stitching approach that combines visual data from the mobile imaging device and an inertial sensor from an Inertial Measurement Unit (IMU) mounted on the mobile imaging device, with a feedback for error correction to generate robust stitching outputs in indoor scenario.

12 Claims, 11 Drawing Sheets

(56) References Cited

U.S. PATENT DOCUMENTS

| | | | |
|---|---|---|---|
| 2014/0037216 A1* | 2/2014 | Kumar | G06K 9/6249 382/197 |
| 2014/0086494 A1* | 3/2014 | Benhimane | G06T 3/0093 382/215 |
| 2014/0126768 A1 | 5/2014 | Ramachandran et al. | |
| 2015/0121989 A1 | 5/2015 | Orzechowski | |
| 2017/0124680 A1 | 5/2017 | Holzer et al. | |

* cited by examiner

METHOD AND SYSTEM FOR FRAME STITCHING BASED IMAGE CONSTRUCTION IN AN INDOOR ENVIRONMENT

PRIORITY CLAIM

This U.S. patent application claims priority under 35 U.S.C. § 119 to: India Application No. 201821016198, filed on Apr. 30, 2018. The entire contents of the aforementioned application are incorporated herein by reference.

TECHNICAL FIELD

The disclosure herein generally relates to image processing, and, more particularly, to frame stitching based image construction for an indoor environment.

BACKGROUND

Mobile imaging devices such as Unmanned Aerial Vehicles (UAVs) or the like, are being widely used for multitude of tasks where human involvement may be a challenge or may provide low efficiency. Typically, in indoor environments which are widely spread across larger areas often with limited lightening conditions and difficulty in ease of access to locations of the indoor environment, imaging devices are popular choice to scan and monitor the indoor environments. Typical examples of such indoor environments include industry environment, warehouse environment, shopping malls and the like. Monitoring and inspection task of the mobile imaging device, for example the UAV, requires the UAV to capture image of a scene of interest. Once the scene is captured as a series of image frames, image processing is performed on the image frames to extract information. To capture maximum details or information of the scene, images are captured from closer range. Specific details of interest may include information of a product stocked in warehouse such as barcode of a product and the like. However, close capture of images leads to loss of context, also referred as global context, associated with the scene of interest. Recovery of the global context is possible through video stitching or frame stitching, wherein key frames from a sequence of image frames in a video being captured are stitched to construct image of the scene of interest. Existing methods for key frame selection mostly focus on overlap criteria for consecutive key frame selection, however such selection criteria may compromise on the quality of the key frame, effectively reducing quality of the constructed image.

Existing methods stitch the key frames based on features extracted from the key frames. However, these existing methods work well, provided the scene is planar, the images are taken with appropriate placement of the mobile imaging device and they are static. The indoor environments however often pose multiple challenges. Firstly, there is often loss of Global Positioning System (GPS) signal and the indoor environment may have poor and varying lighting conditions. Secondly, for applications such as asset monitoring, video (of an object/area of interest) is required to be captured from distances very close to an object of interest, hence the global context is lost. Thirdly, between consecutive frames, feature points repeat as the area or scene of interest being monitored has similar objects stacked one above another. Thus, the existing video stitching approaches when applied for indoor environments may have limitations affecting clean stitching between the key frames, which in turn introduces errors in an image constructed for the scene of interest by stitching the key frames.

SUMMARY

Embodiments of the present disclosure present technological improvements as solutions to one or more of the above-mentioned technical problems recognized by the inventors in conventional systems. For example, in one embodiment, a method for frame stitching based image construction is disclosed. The method comprises receiving a sequence of a plurality of image frames from a mobile imaging device, wherein the plurality of image frames correspond to a scene of interest in an indoor environment. The method further comprises receiving a positional data of the mobile imaging device from an Inertial Measurement Unit (IMU) of the mobile imaging device, wherein the IMU provides change in the positional data corresponding to each image frame among the plurality of image frames. The method further comprises receiving a plurality of device parameters of the mobile imaging device, wherein the plurality of device parameters comprise a horizontal field of view (FoV), a vertical FoV and frame dimensions of the plurality image frames. Further, the method comprises selecting a set of key frames from the plurality of image frames. The set of key frames comprises an initial key frame identified based on an initial key frame criteria and key frames placed at a predefined distance interval starting from the initial key frame. Each key frame from the set of key frames provides a maximum average of luminance and variance over a predefined interval. Further, more the method comprises stitching the set of key frames to construct an image of the scene of interest. The stitching comprises selecting one key frame and a corresponding consecutive key frame from the set of key frames, wherein the selected key frame is the initial key frame during first iteration of stitching the set of key frames. Further, determining a warping matrix between the selected key frame and the corresponding consecutive key frame for initialization during image registration. Elements of the warping matrix comprise a horizontal translation parameter and a vertical translation parameter and are derived from a change in IMU positional data received for each key frame and the plurality of device parameters, wherein IMU positional data correspond to an accelerometer and gyroscope information of the IMU. Further, the stitching comprises generating a refined warping matrix from the warping matrix to perform an image intensity based registration refinement. Furthermore the stitching comprises estimating a constraint feature based warping matrix to stitch the selected key frame and the corresponding consecutive key frame. The estimation is based on the refined warping matrix and a plurality of features extracted from a constrained space of the selected key frame and the corresponding consecutive key frame. The extracted plurality of features provide key point correspondence between the key frame and the consecutive key frame. Further, more the method comprises constructing an image of the scene of interest by iterating the stitching of each key frame from the set of key frames and the corresponding consecutive key frame of each key frame in sequence.

In yet another embodiment, an image construction system for frame stitching based image construction. The image construction system comprises a processor, an Input/Output (I/O) interface, a memory. The memory comprises a frame stitching module configured to receive a sequence of a plurality of image frames from a mobile imaging device, wherein the plurality of image frames correspond to a scene of interest in an indoor environment. Further, receive positional data of the mobile imaging device from an Inertial Measurement Unit (IMU) of the mobile imaging device, wherein the IMU provides change in the positional data corresponding to each image frame among the plurality of image frames. Further, receive a plurality of device parameters of the mobile imaging device, wherein the plurality of device parameters comprise a horizontal field of view (FoV), a vertical FoV and frame dimensions of the plurality image frames. The frame stitching module is further configured to select a set of key frames from the plurality of image frames, wherein the set of key frames comprises an initial key frame identified based on an initial key frame criteria and key frames placed at a predefined distance interval starting from the initial key frame. Each key frame from the set of key frames provides a maximum average of luminance and variance over a predefined interval defined by number of image frames. The frame stitching module is further configured to stitch the set of key frames to construct an image of the scene of interest. To stitch the key frames the frame stitching module is configured to select one key frame and a corresponding consecutive key frame from the set of key frames, wherein the key frame is the initial key frame during first iteration of stitching the set of key frames. Further, determine a warping matrix between the selected key frame and the corresponding consecutive key frame for initialization for image registration, wherein elements of the warping matrix comprise a horizontal translation parameter and a vertical translation parameter derived from a change in IMU positional data received for each key frame and the device parameters. The IMU positional data correspond to an accelerometer and gyroscope information of the IMU. Further, generate a refined warping matrix from the warping matrix to perform an image intensity based registration refinement. The frame stitching module is further configured to estimate a constraint feature based warping matrix to stitch the key frame and the consecutive key frame from the refined warping matrix and a plurality of features extracted from a constrained space of the selected key frame and the corresponding consecutive key frame. The extracted plurality of features provide key point correspondence between the key frame and the consecutive key frame. Furthermore, the frame stitching module is configured to construct an image of the scene of interest by iterating the stitching of each key frame from the set of keyframes and the corresponding consecutive key of each keyframe, in sequence.

In yet another aspect, a non-transitory computer readable medium is provided. The non-transitory computer-readable medium stores instructions which, when executed by a hardware processor, cause the hardware processor to perform actions comprising receiving a sequence of a plurality of image frames from a mobile imaging device, wherein the plurality of image frames correspond to a scene of interest in an indoor environment. The actions further comprise receiving positional data of the mobile imaging device from an Inertial Measurement Unit (IMU) of the mobile imaging device, wherein the IMU provides change in the positional data corresponding to each image frame among the plurality of image frames. The actions further comprise receiving a plurality of device parameters of the mobile imaging device, wherein the plurality of device parameters comprise a horizontal field of view (FoV), a vertical FoV and frame dimensions of the plurality image frames. The actions further comprise selecting a set of key frames from the plurality of image frames. The set of key frames comprises an initial key frame identified based on an initial key frame criteria and key frames placed at a predefined distance interval starting from the initial key frame. Each key frame from the set of key frames provides a maximum average of luminance and variance over a predefined interval defined by number of image frames. Further, more the actions comprise stitching the set of key frames to construct an image of the scene of interest. The stitching comprises selecting one key frame and a corresponding consecutive key frame from the set of key frames, wherein the key frame is the initial key frame during first iteration of stitching the set of key frames. Further, determining a warping matrix between the selected key frame and the corresponding consecutive key frame for initialization for image registration. Elements of the warping matrix comprise a horizontal translation parameter and a vertical translation parameter are derived from the change in IMU positional data received for each key frame and the device parameters, wherein IMU positional data correspond to an accelerometer and gyroscope information of the IMU. Further, the stitching comprises generating a refined warping matrix from the warping matrix to perform an image intensity based registration refinement. Furthermore the stitching comprises estimating a constraint feature based warping matrix to stitch the selected frame and the corresponding consecutive key frame from the refined warping matrix. The estimation is based on a plurality of features extracted from a constrained space of the selected key frame and the corresponding consecutive key frame. The extracted plurality of features provide key point correspondence between the key frame and the consecutive key frame. Furthermore, the actions comprise constructing an image of the scene of interest by iterating the stitching of each key frame and the corresponding consecutive key frame of each keyframe, in sequence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
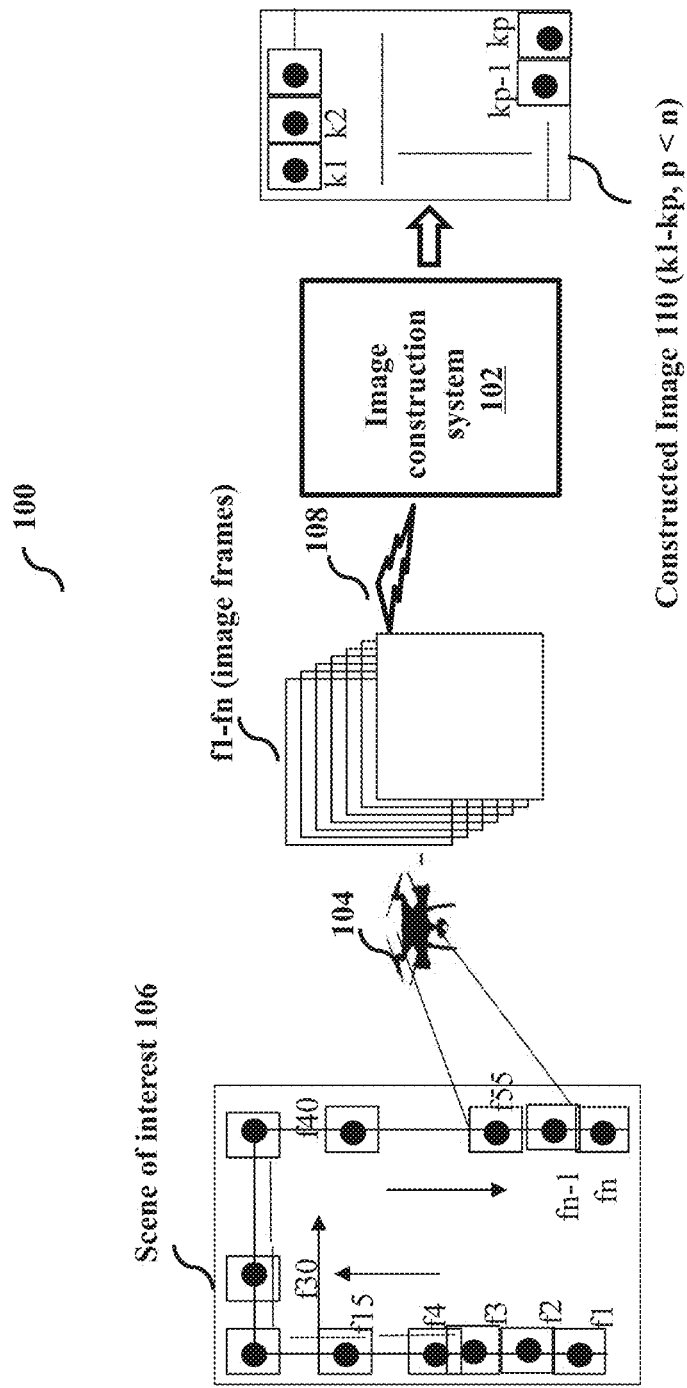
FIG. 1 illustrates an exemplary environment implementing frame stitching based image construction system for an indoor environment to construct image of a scene of interest from a plurality of frames of the scene captured by a mobile imaging device, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 9, where similar reference characters denote corresponding features consistently throughout the figures, there are shown preferred embodiments and these embodiments are described in the context of the following exemplary system and/or method. The embodiments herein provide a method and a system for frame stitching based image construction for an indoor environment. The method enables constructing an image of a scene of interest (scene) in the indoor environment by stitching a plurality of key frames identified from a plurality of image frames (frames) of the scene. The plurality of image frames are captured by a mobile imaging device while traversing a path to cover the entire scene. The method and the system can be applied to the indoor environment such as a warehouse, a large mart and the like and overcomes multiple challenges posed by the indoor environment, effectively providing clean or smooth stitching of the key frames to construct the image of the scene, as compared to the existing frame stitching methods. The term clean or smooth refers to reduced demarcation at boundary of each key frame. The method provides image stitching approach that combines data from a visual sensor, such as the mobile imaging device and an inertial sensor such as an Inertial Measurement Unit (IMU) mounted on the mobile imaging device, with a feedback for error correction to generate robust stitching outputs in indoor scenario. The method enables handling of the issues of sparse feature points or lack of feature point correspondence in a given scene by extracting key frames from the video, and intelligently combining the positional data available from the onboard IMU and visual features from the plurality of image frames captured by the mobile imaging device, to stitch the key frames together.

FIG. 1 illustrates an exemplary environment 100 implementing frame stitching based an image construction system 102 for the indoor environment to construct image of a scene of interest (scene) 106 from a plurality of frames of the scene captured by a mobile imaging device 104, according to some embodiments of the present disclosure. The environment 100 depicts the scene of interest 106, alternatively referred as scene 106, in the indoor environment. As depicted, the scene 106 can be captured by the mobile imaging device 104, while traversing a predefined path. The entire scene 106 is captured in form of a video comprising sequence of image frames, alternatively referred as a plurality of image frames (f1-fn). The path traversed by the mobile imaging device 104, for example, may be a raster scan path or the like which covers the entire scene 106. In an embodiment, the image construction system 102 may be implemented internally within a computing device or may be externally coupled to the computing device.

In an embodiment, the image construction system 102 can be configured to receive the video, as sequence of the plurality of image frames, transmitted by the mobile imaging device 104. Transmission and reception of the image frames (f1-fn) between the mobile imaging device and the image construction system can be over a wired or a wireless network 108, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the image construction system 102 through communication links. In an embodiment, the computing device, which implements the image construction system 102 can be a workstation, a mainframe computer, a personal digital assistant, a general purpose server, a network server or the like. Further, on receiving the plurality of image frames f1-fn, the image construction system 102 can be configured to identify or select a set of key frames (k1-kp, p<n) from the plurality of frames f1-fn received from the mobile imaging device 104. Each key frame is then stitched with a consecutive key frame using a constraint feature based warping matrix determined for the two key frames (selected key frame and corresponding consecutive key frame) under consideration. The constrained feature based warping matrix is estimated from a plurality of features extracted from a limited constrained space of the selected key frame and the corresponding consecutive key frame. The extracted plurality of features provide key point correspondence between the key frame and the consecutive key frame. Further, the image construction system 102 can be configured to construct the image of the scene of interest 106 by iterating the stitching of the key frame and the consecutive key frame for all the key frames from the set of key frames, in sequence.

In an embodiment, if the extracted plurality of features, which provide key point correspondence between the key frame and the consecutive key frame are below a key point threshold then the image construction system 106 is further configured to apply a selective approach with feedback for the frame stitching based image construction method. The selective approach with feedback applies a modified warping matrix for stitching the key frames to construct the image of the scene 106, explained further in conjunction with FIG. 4.

Figure 2:
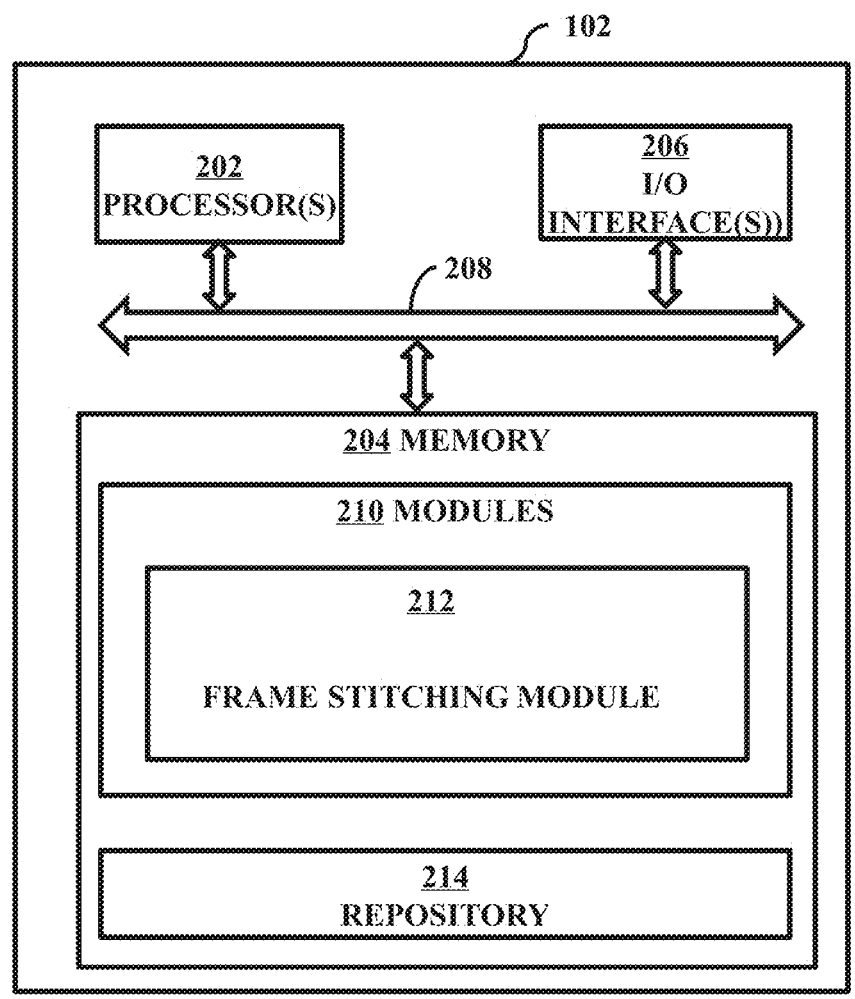
FIG. 2 is a functional block diagram of the image construction system of FIG. 1, according to some embodiments of the present disclosure.

The components or modules and functionalities of image construction system 102 for frame stitching based image construction are described further in detail in conjunction with FIG. 2.

FIG. 2 is a functional block diagram of the image construction system 102 of FIG. 1, according to some embodiments of the present disclosure. The image construction system 102 includes or is otherwise in communication with one or more hardware processors such as a processor(s) 202, at least one memory such as a memory 204, and an I/O interface 206. The processor 202 (hardware processor), the memory 204, and the I/O interface(s) 206 may be coupled by a system bus such as a system bus 208 or a similar mechanism. The memory 204 further may include modules 210.

In an embodiment, the modules 210 include a frame stitching module 212 and other modules (not shown) for implementing functions of the image construction system 102. In an embodiment, the modules 210 can be an Integrated Circuit (IC), external to the memory 204 (not shown), implemented using a Field-Programmable Gate Array (FPGA) or an Application-Specific Integrated Circuit (ASIC). The names of the modules of functional block within the modules 210 referred herein, are used for explanation/illustration purpose and are not as a limitation. Further, the memory 204 can also include a repository 214.

In an embodiment, the frame stitching module 212 can be configured to receive the plurality of image frames f1-fn transmitted by the mobile imaging device 104. The frame stitching module 212 also receives positional data of the mobile imaging device from the Inertial Measurement Unit (IMU) of the imaging mobile device 104. The IMU provides positional data corresponding to each image frame among the plurality of image frames. Further, the frame stitching module 212 also receives a plurality of device parameters (interchangeably referred as device parameters) of the mobile imaging device 104. The device parameters comprise a horizontal field of view (FoV), a vertical FoV and frame dimensions of the plurality image frames. On receiving the plurality of image frames f1-fn, the image construction system 102 can be configured to identify or select the set of key frames (k1-kp, p<n) from the plurality of frames f1-fn received from the mobile imaging device 104. Each key frame is then stitched with the consecutive key frame using the constraint feature based warping matrix determined for the two key frames under consideration. The constrained feature based warping matrix is estimated from the plurality of features extracted from the limited constrained space of the key frame and the consecutive key frame and a refined warping matrix ($M_{int}$). The refined warping matrix is derived from a warping matrix ($M_{imu}$) defined by matrix elements comprising the positional data and the device parameters. The extracted plurality of features provide key point correspondence between the key frame and the consecutive key frame. Further, the frame stitching module 212 can be configured to construct the image of the scene of interest 106 by iterating the stitching of the key frame and the consecutive key frame for all the key frames from the set of key frames, in sequence.

In an embodiment, if the extracted plurality of features, which provide key point correspondence between the key frame and the consecutive key frame are below the key point threshold then the frame stitching module is further configured to apply the selective approach with feedback ($A_{set}$) for the frame stitching based image construction method. The selective approach with feedback creates the modified warping matrix for stitching the key frames to construct the image of the scene 106, as explained further in conjunction with FIG. 4, not explained herein for brevity.

The hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210 such as frame stitching module 212 and other memory modules (not shown), which may be internal or external to the memory 204, for triggering execution of functions to be implemented by the modules 210.

The I/O interface(s) 206 in the image construction system 102 may include a variety of software and hardware interfaces, for example, a web interface, a graphical user interface and the like. The interface(s) 206 may include a variety of software and hardware interfaces, for example, interfaces for peripheral device(s), such as a keyboard, a mouse, an external memory, sensors, the plurality of image frames from the mobile imaging device 104, and a printer and a display for printing or displaying the constructed image of the scene of interest 106. The interface(s) 206 may enable the image construction system 102 to communicate with other devices, such as the computing device, web servers and external databases (such as the repository 214, if external to the image construction system 102). The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting a number of computing systems with one another or to another server computer. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the SAE system 102. The repository 214 may store data that is processed, received, or generated as a result of the execution of one or more modules in the module(s) 210. The stored data may include received plurality of frames f1-fn, the selected set of key frames k1-kp, the warping matrix, the refined warping matrix, the constrained feature based warping matrix, the modified warping matrix and all the intermediate data generated during processing to construct the image using key frames.

Figure 3:
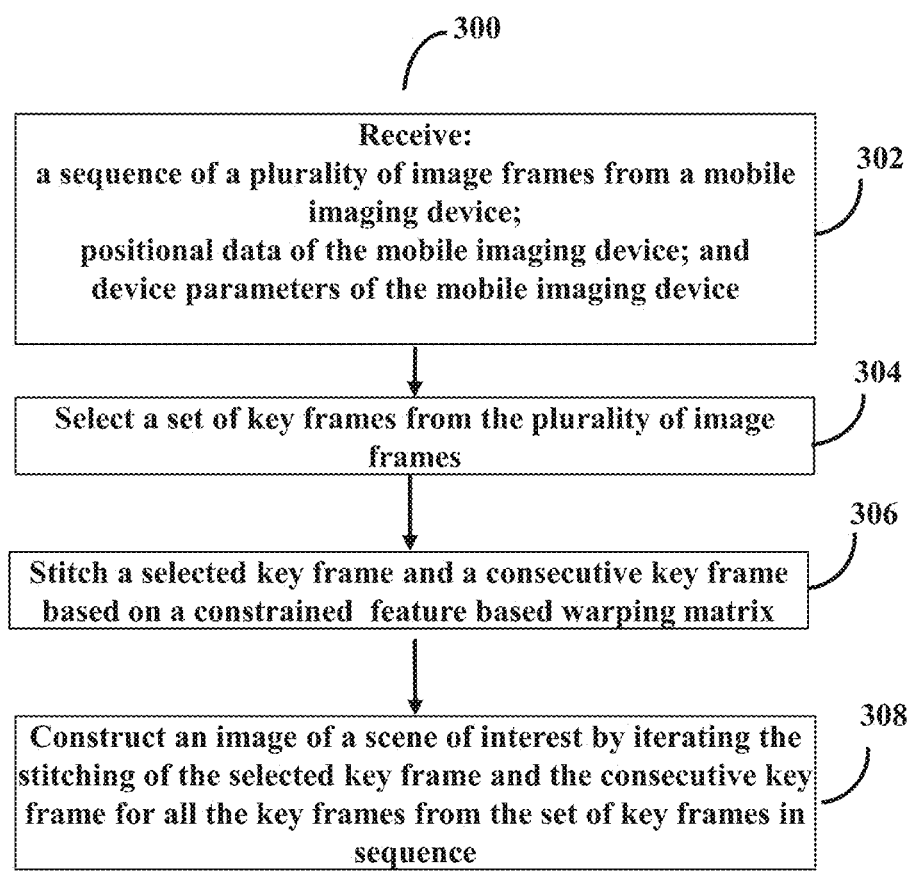
FIG. 3 is a flow diagram illustrating a method for frame stitching based image construction for the indoor environment to construct image of the scene of interest from the plurality of frames of the scene captured by the mobile imaging device, in accordance with some embodiments of the present disclosure.

FIG. 3 is a flow diagram illustrating a method 300 for frame stitching based image construction for the indoor environment, in accordance with some embodiments of the present disclosure.

In an embodiment, at step 302, the method 300 allows the frame stitching module 212 to receive the sequence of the plurality of image frames (f1-fn) from the mobile imaging device 104, captured for the scene of interest 106 for the indoor environment. Along with the plurality of frames, the frame stitching module 212 also receives positional data of the mobile imaging device 104 from the IMU of the imaging mobile device 104. The IMU provides positional data in terms of coordinates (x,y,z) corresponding to each image frame among the plurality of image frames. The IMU also provides the device parameters of the mobile imaging device. The device parameters comprise the horizontal field of view (FoV), the vertical FoV, and frame dimensions of the plurality image frames.

For example, the mobile imaging device 104 such as a drone is flown in the indoor environment, about one meter from the scene of interest 106. The mobile imaging device 104 can be configured to fly in the raster scan path to capture the entire area or scene 106. The plurality of image frames (f1-fn) can be captured at 30 frames per second, with a resolution 4096×2160. The raster scan path provides a path to best capture the scene 106 balancing between unnecessary multiple image frame captures of same area within the scene 106 and missing out an area of the scene. However, raster scan is an example path used and any other path may be followed that captures the scene 106, entirely. Along with the image frames, the IMU also provides accelerometer and gyroscope information. This information provided by the IMU positional data, alternatively referred as IMU data, is used to compute the change in position of the mobile imaging device 104.

Figure 5:
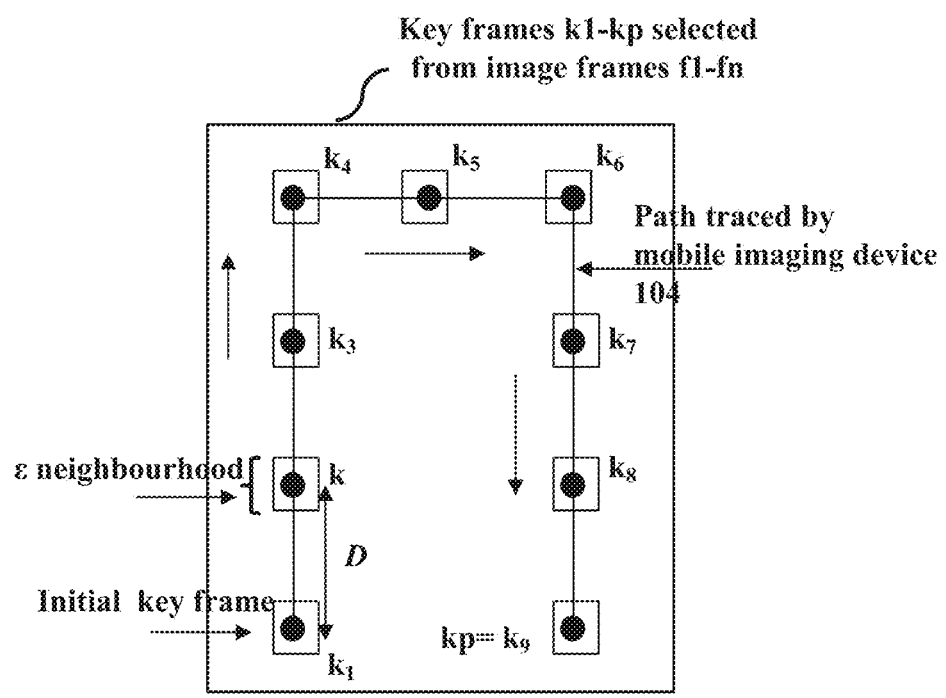
FIG. 5 is an example illustrating selection of a plurality of key frames from the plurality of image frames captured by the mobile imaging device for image construction of the scene of interest, in accordance with some embodiments of the present disclosure.

At step 304, the method 300 allows the frame stitching module 212 to selecting the set of key frames (k1-kp, p<n) from the plurality of image frames. The set of key frames comprises an initial key frame identified based on an initial key frame criteria and consecutive key frames placed at a predefined distance interval starting from the initial key frame. Each key frame from the set of key frames provides a maximum average of luminance and variance over a predefined interval defined by number of image frames. FIG. 5 is an example illustrating key frame selection (k1tokp, p<n) from the plurality of image frames f1-fn captured by the mobile imaging device 104 for the frame stitching based image construction of the scene of interest 106, in accordance with some embodiments of the present disclosure. For example the initial key frame criteria can be 'select a first image frame as an initial key frame, or select first image frame from f1-fn that has the luminance value above a threshold. Further, the criteria for selection of consecutive key frames can be defined, where it states, 'there should be reasonable overlap between the key frames', and 'that the key frames must be of good quality (high contrast and not blurred)'. The reasonable overlap refers to overlap by 60% or above. Once the initial key frame is selected, selecting, the other key frames for the set of key frame comprises identifying next key frame that falls in a distance interval D±e from the previous key frame, where e is empirically chosen. The key frame selection from the frame in this interval D as shown in FIG. 5, illustrating selection of a plurality of key frames from the plurality of image frames captured by the mobile imaging device 104 for image construction of the scene of interest, is performed by measuring two metrics, the luminance and variance. In a particular interval (for example, from frame f1-fn), the image giving the maximum average of luminance and variance is chosen as the key frame.

Equation 1a gives the computation of luminance L using the RGB image intensities.

$$L = \text{mean}(0:2126*R + 0:7152*G + 0:0722*B) \quad (1a)$$

The variance equation is given by equation 1 b:

$$\frac{\Sigma(I - \text{mean}(I))^2}{(r*c - 1)} \quad (1b)$$

Where, r and c are length and width of the image respectively.

Thus, this process of selecting key frames by looking at a distance interval from the previous key frames, and the quality of the frames in the interval. This IMU-based key frame selection provides the set of key frames spanning the entire scene 106. Typically, the distance interval D is set as 1.5 cm to 2.5 cm. This results in about ten frames for a minute long video.

Thus, the method 300 enables selection of key frames based on a combination of image frame position and image frame quality. This ensures that an optimal number of key frames are chosen with reasonable overlap, and the key frames are of good quality for stitching. The positional data is extracted from the IMU sensors such as the gyroscope and the accelerometer, and directly used to determine the distance interval D for key frame selection. Furthermore, the image quality metrics are computed for a subset of the frames in a neighborhood around the distance interval D, and then the key frames are selected. Hence, the method 300 provides considerable gain in terms of computational efficiency reducing time taken to stitch the key frames to construct the image.

The method 300 provides combining image features from the key frames and the metadata from the IMU. The IMU provides approximate positional information (positional data) about each frame, while the features or image features give point correspondences between the key frames. Relying only on the IMU data for stitching can create alignment problems and cause accumulation of error, while using only image features for stitching can give unstable or completely wrong warping in certain cases. Thus method 300 provides use of the advantage offered by both approaches by combining the two in an intelligent manner.

Thus, at step 306, the method 300 includes allowing the frame stitching module 212 to stitch the set of key frames to construct the image of the scene 106. The stitching comprises selecting the key frame and the consecutive key frame from the set of key frames. The key frame is the initial key frame during first iteration of stitching the set of key frames. Once the key frames are selected, the method 300 comprises determining the warping matrix between the key frame and the consecutive key frame for initialization. Elements of the warping matrix comprise a horizontal translation parameter and a vertical translation parameter. The positional information provided by the IMU, and the device parameters are used to compute the horizontal and vertical translations tx (horizontal translational parameter) and ty (vertical translational parameter) respectively, and initialize the warping matrix between two consecutive key frames.

Figure 6A:
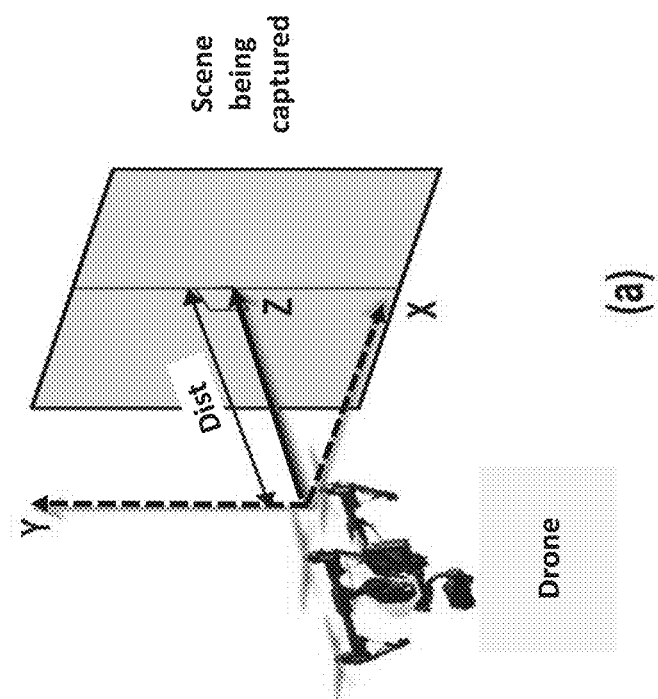
FIG. 6a illustrates parameters used for computation of a horizontal translational parameter and a vertical translational parameter for a warping matrix, in accordance with some embodiments of the present disclosure.
Figure 6A:
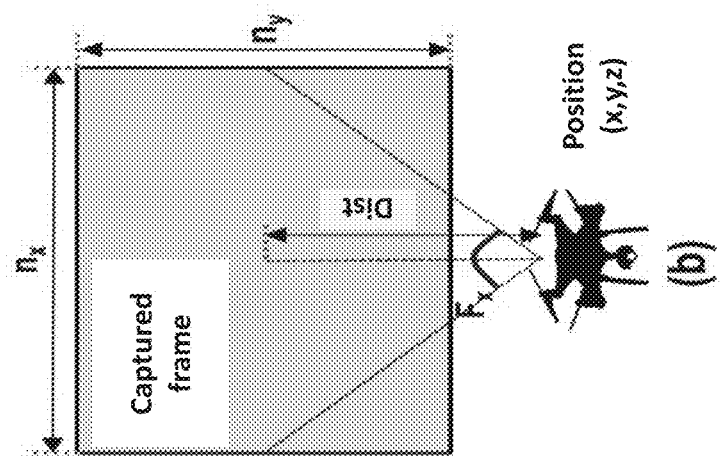

Let, positions of the key frames k1 and K2 be (x1, y1, z1) and (x2, y2, z2) (in meters) as shown in FIG. 6a, ((a) and (b)), and the xyz-convention as shown in FIG. 6a (a). Let the horizontal FoV, the vertical FoV be given by Fx and Fy degrees respectively and the captured frame dimensions as ($n_x$*$n_y$) in pixels as shown in FIG. 6a (b). The perpendicular distance of the mobile imaging device 104 from an object in the scene of interest 106 is given by Dist (in meters). These parameters are indicated in FIG. 6a (b). The translations $t_x$ and $t_y$ is computed using the following equations:

$$tx = \delta x \tfrac{n_x}{dx},\ ty = \delta y \tfrac{n_y}{dy} \quad (2)$$

Where, δx/\δy is the displacement in the x and y directions given by (x2−x1) and (y2−y1) respectively, and δx/\δy are the horizontal and vertical dimensions of the image in meters, computed using the equations below.

$$\delta x = 2(Dist)\tan(Fx/2); \delta y = 2(Dist)\tan(Fy/2) \quad (3a)$$

The warping matrix ($M_{imu}$) for initialization is then given by the matrix $$\begin{bmatrix} 1 & 0 & t_x \\ 0 & 1 & t_y \\ 0 & 0 & 1 \end{bmatrix} \quad (3b)$$

Once the warping matrix ($M_{imu}$) is generated, at step 306, the method 300 further includes generating the refined warping matrix ($M_{int}$) from the warping matrix. The warping matrix ($M_{imu}$) calculated, is used as initialization for further performing an image intensity based registration refinement ($A_{int}$). A gradient descent optimizer, and a mean squares metric, is used, wherein the transformation is set to only translation, to get the refined warping matrix $M_{int}$. The refined warping matrix is generated from the warping matrix by applying a gradient decent optimizer and minimization of a mean square error (MSE) metric with transformation set to translation.

Figure 6B:
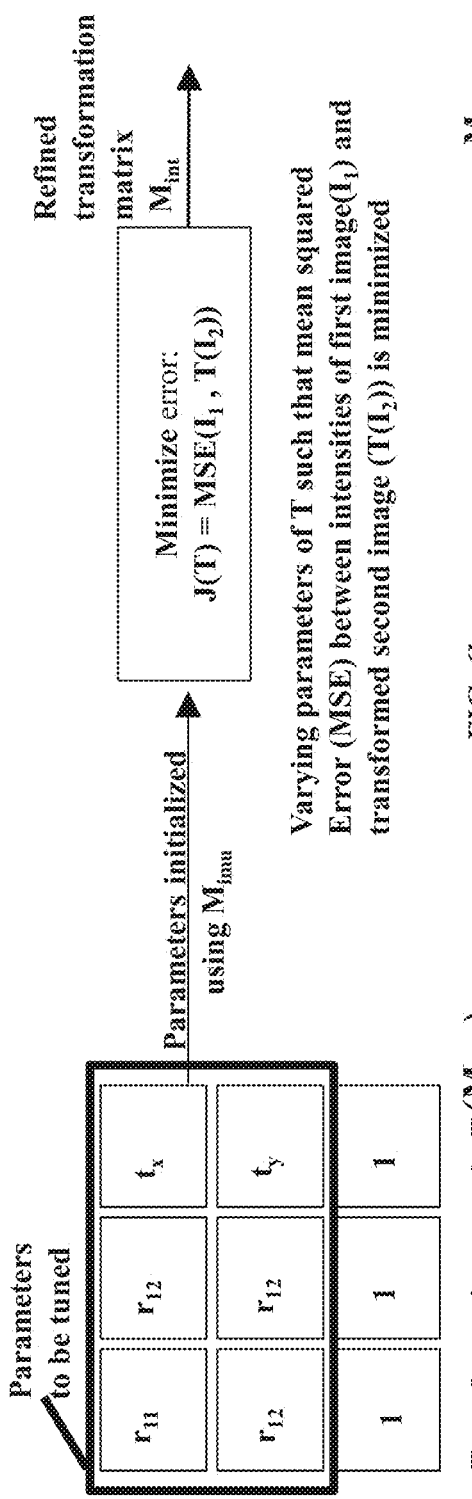
FIGS. 6b and 6c is an example illustrating intensity based refinement on Inertial Measurement Unit (IMU) initialization, in accordance with some embodiments of the present disclosure.
Figure 6C:
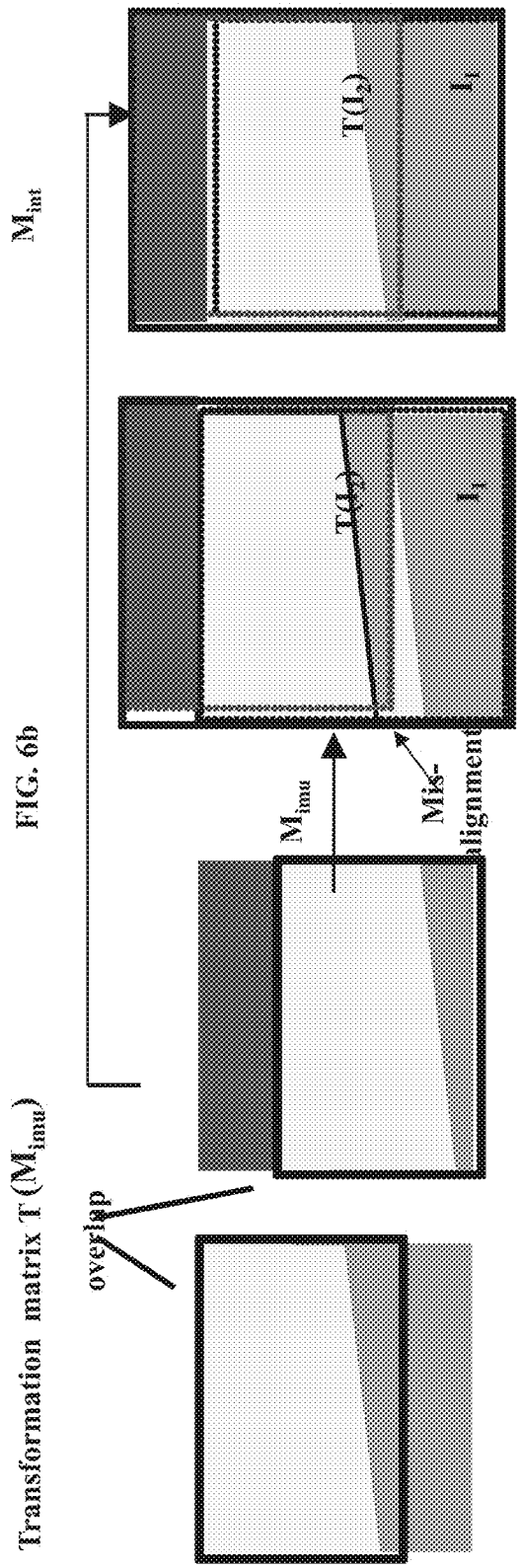

This is explained using an illustration in FIGS. 6b and 6c. FIG. 6b shows the transformation matrix T which is initialized as $M_{imu}$. This is followed by minimizing the means square error (MSE) between the first key frame ($I_1$) and the transformed second key frame ($I_2$) (applying transformation T on $I_2$) using the gradient descent optimizer. The transformation for which the minimum MSE is achieved is the refined warping matrix $M_{int}$ obtained by:

Minimize error: $J(T) = MSE(I_1, T(I_2))$ (3c)

The improvement in the transformation can be seen in the alignment between $I_1$ and $I_2$ in FIG. 6c.

Figure 6D:
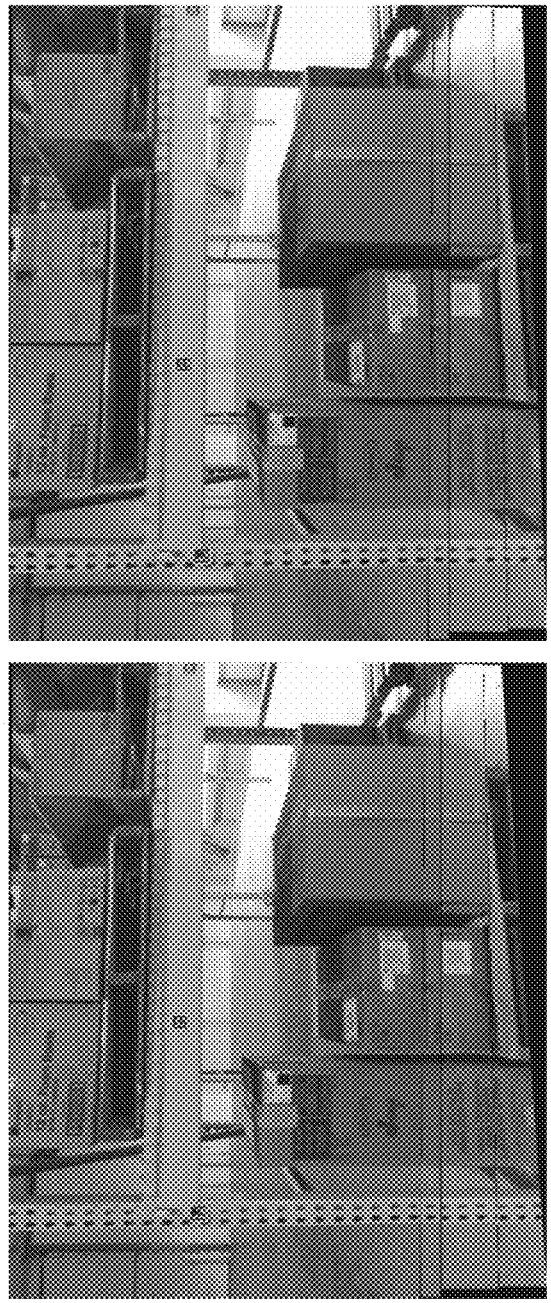
FIG. 6d compares stitching of two key frames using the IMU based initialization and after image-intensity based refinement, in accordance with some embodiments of the present disclosure.

FIG. 6d compares stitching of two key frames using IMU based initialization ($A_{imu}$) and after image-intensity based refinement ($A_{int}$). The IMU positional data gives the approximate translation values. This results in misalignments as seen in FIG. 6d (a), which get corrected considerably by additional refinement using image information as seen in FIG. 6d (b).

Figure 8:
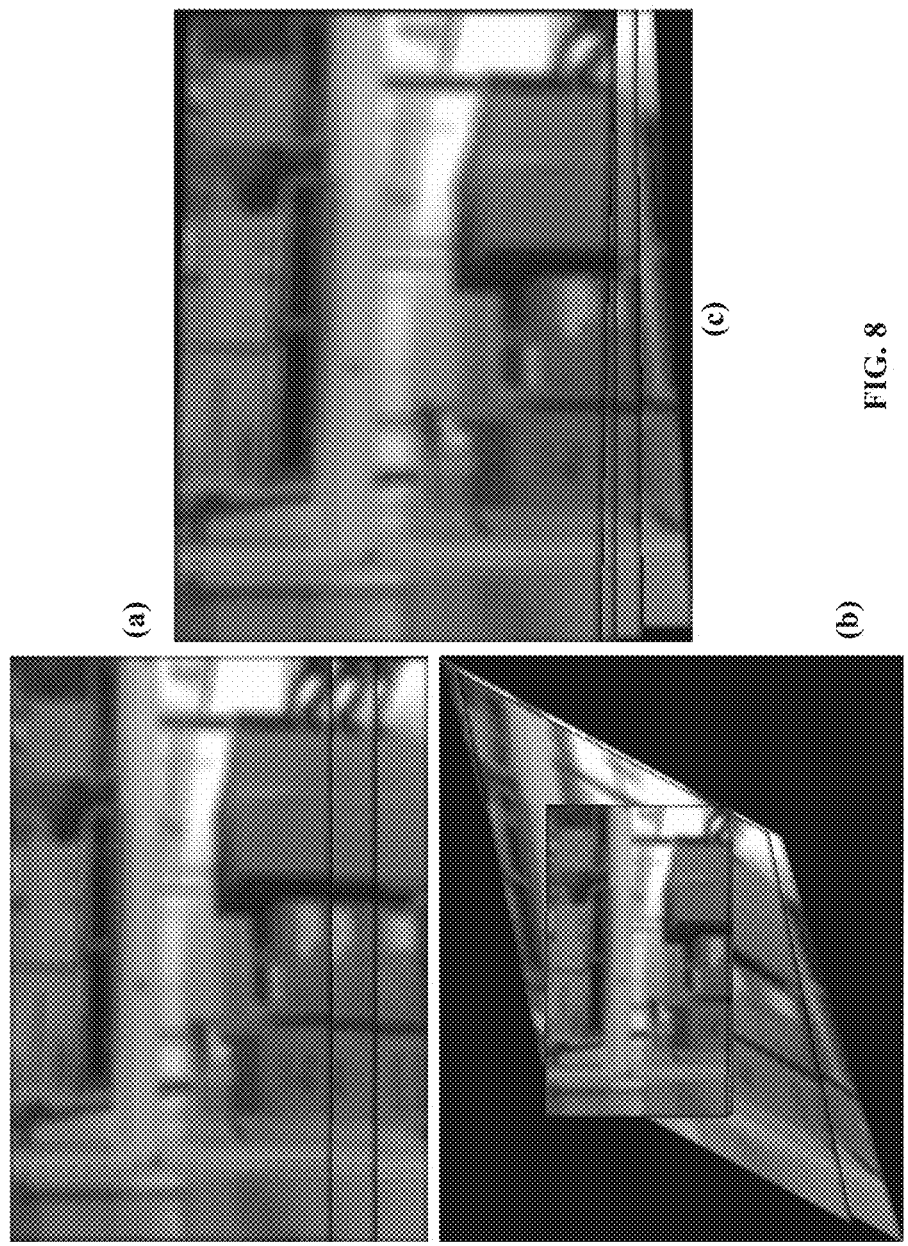
FIG. 8 illustrates an example of constructed image with and without using selective feedback approach, in accordance with some embodiments of the present disclosure.

Once the refined warping matrix $M_{int}$ is generated the two key frames being considered (the frame and the consecutive key frame) can be stitched by estimating the constraint feature based warping matrix ($M_{fea}$) from a plurality of features extracted from a constrained space ($A_{fea}$). The extracted plurality of features provide key point correspondence between the key frame and the consecutive key frame, wherein the constrained space ($A_{fea}$) is determined by the horizontal translation parameter (tx) and the vertical translation parameter (ty). The IMU-based initialization ($A_{imu}$) followed by image intensity-based refinement ($A_{int}$) performs reasonably well for two images, as shown in FIG. 6d (b). However, IMU data (tx and ty) provides only rough estimates of the frame positions, and is prone to error. With more number of images for stitching, this error accumulates and causes large misalignments and major stitching issues, as can be observed as in FIG. 8 (a). The image intensity-based refinement can only find a suitable transformation within a range of provided initialization, and fails with IMU error accumulation. Applying a feature based stitching approach, which relies solely on achieving key point matches between frames, requires the images to be of high quality, and containing enough information to establish reliable point correspondences. These conditions may not always be satisfied in an indoor inspection scenario. Specifically, these problems are encountered for multiple similar objects placed together (in a warehouse scenario); and light reflections from the boxes wrapped in transparent sheet, which leads to erroneous point correspondences between consecutive frames. In such cases, the feature-based stitching results in unstable warps, as shown in FIG. 8 (b).

Figure 7:
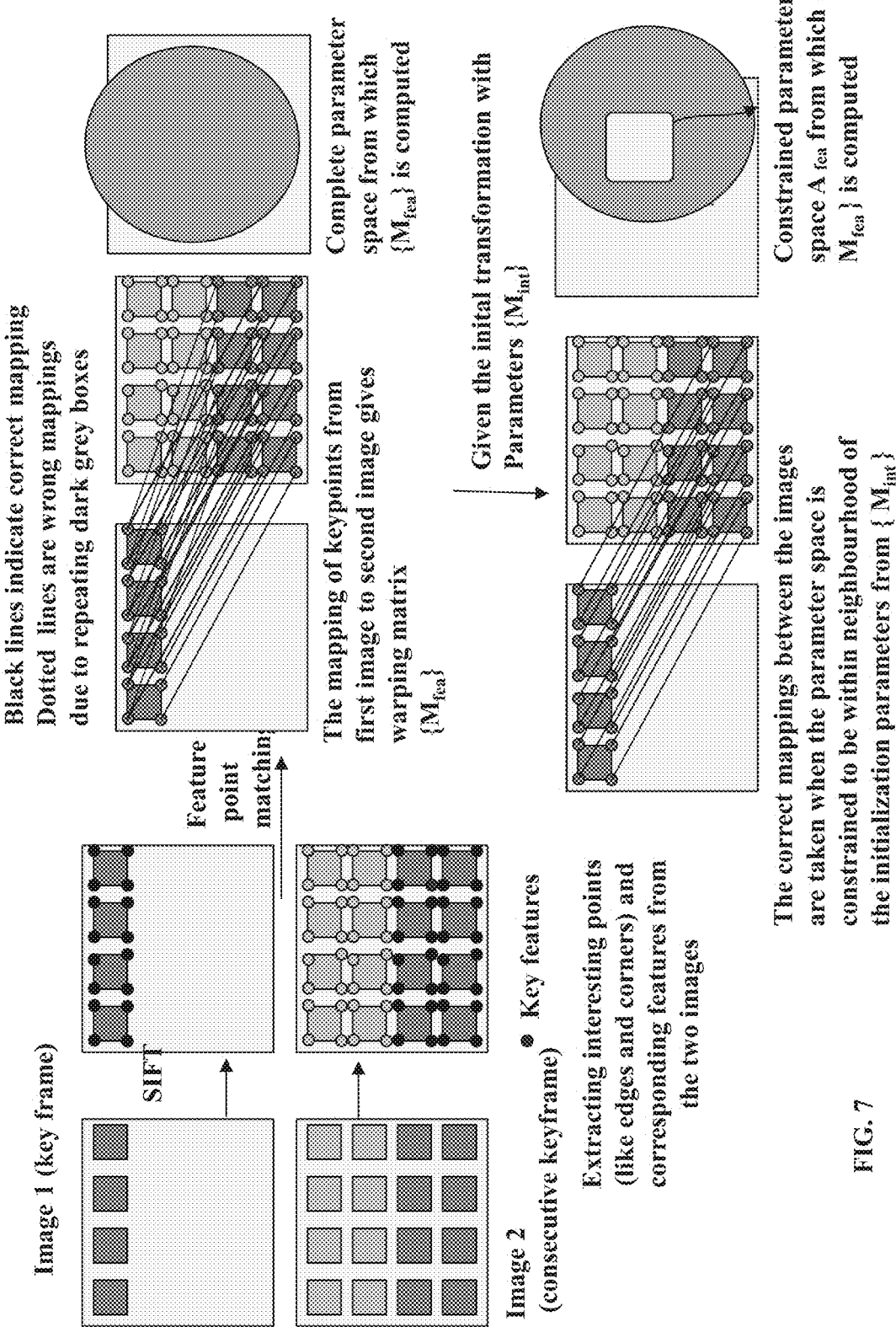
FIG. 7 is schematic illustration of extraction of features from a constrained space of a key frame for frame stitching based image construction, in accordance with some embodiments of the present disclosure.

Thus, the method 300 provides a unique procedure to combine IMU data and image features, by performing feature-based stitching on the constrained parameter space ($A_{fea}$). The IMU data gives the accelerometer and gyroscope information which is used to compute the approximate positional information or positional data. Using this and the device parameters, initial values for tx and ty are calculated. As depicted in FIG. 7 key features corresponds to extracting interesting points (like edges and corners) and corresponding features from the two images. The warp between two key frames is estimated using Scale Invariant Feature Transforms (SIFT) image features on a smaller parameter space that is determined by the IMU data, wherein the translation parameters (tx and ty) are derived from the IMU data The mapping of key points from first image to second image gives the constraint feature based warping matrix ($M_{fea}$). The warping matrix ($M_{fea}$) is computed from the constrained parameter space ($A_{fea}$). The correct mappings between the images are taken when the parameter space is constrained to be within neighbourhood of the initialization matrix $M_{int}$.

The intensity-based refined warping matrix $M_{int}$ is used as an initial estimate, and the image key point correspondences are used to find the warp close to this estimate. The constrained feature based warping matrix ($M_{fea}$) is estimated such that the following criteria are satisfied:

$$M_{fea}(1;1) > 0:8; M_{fea}(2;2) > 0:8 \quad (4)$$

$$j(M_{fea}(1;3) - M\text{int}(1,3))j < 300 \quad (5)$$

$$j(M_{fea}(2;3) - M\text{int}(2;3))j < 300 \quad (6)$$

Equations in 4 put a constraint on the rotation in the image, and equations 5 and 6 limit the horizontal translation and vertical translation to within 300 pixels from the corresponding values in $M_{int}$ achieved using $A_{int}$. This set of conditions ensures $M_{fea}$ is a second level refinement of $M_{int}$, and at the same time is robust to the erroneous point correspondences between key frames.

At step 308, the method allows the frame stitching module 212 to construct the image of the scene of interest by iterating the stitching of the key frame and the consecutive key frame for all the key frames from the set of key frames, in sequence.

Figure 4:
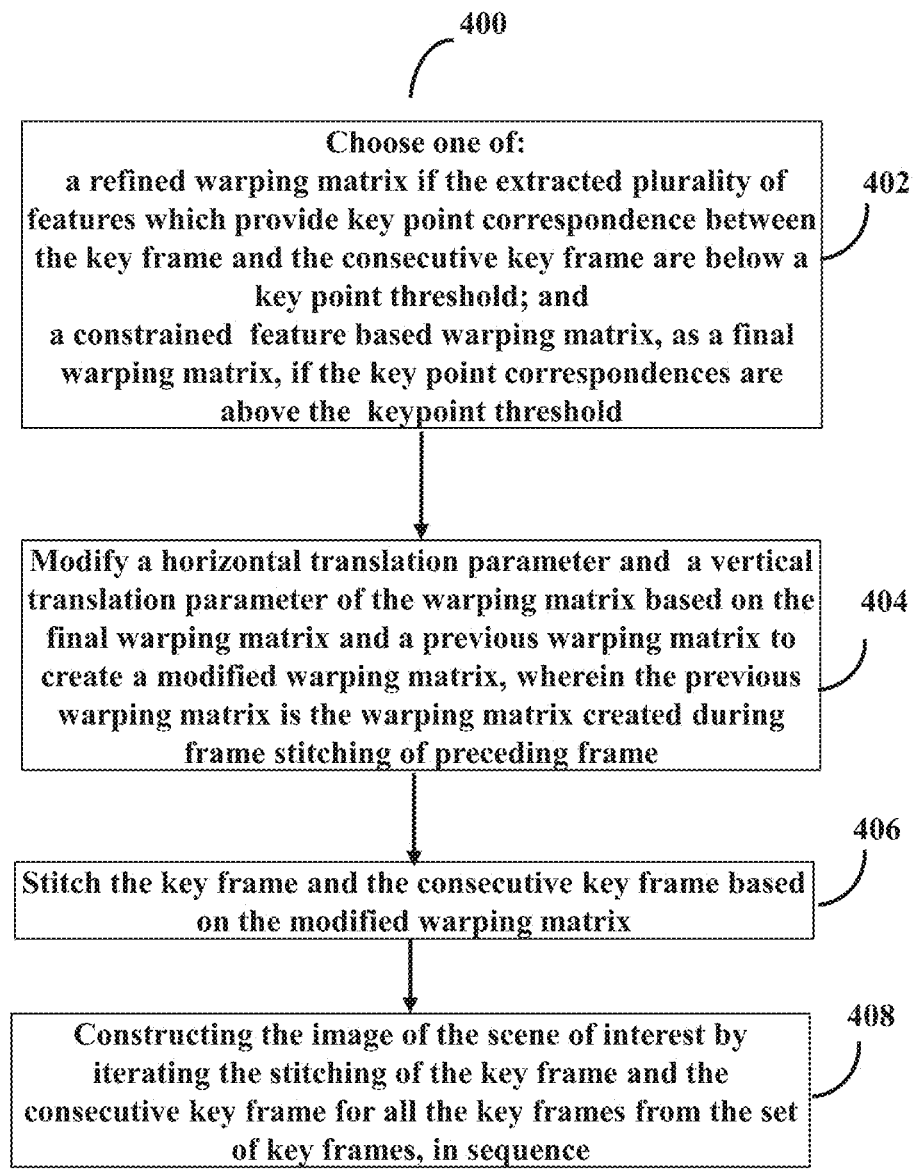
FIG. 4 is a flow diagram illustrating a method for the frame stitching based image construction based on a selective approach with feedback, in accordance with some embodiments of the present disclosure.

FIG. 4 is a flow diagram illustrating a method 400 for the selective approach with feedback ($A_{sel}$) for the frame stitching based image construction, in accordance with some embodiments of the present disclosure.

In an embodiment, if the extracted plurality of features, which provide key point correspondence between the key frame and the consecutive key frame are below the key point threshold then at step 402, the method 400 allows the frame stitching module to choose the refined warping matrix as a final warping matrix for frame stitching, if the extracted plurality of features which provide key point correspondence between the key frame and the consecutive key frame are below a key point threshold, else if the key correspondence are above the key point threshold choose the constrained warping matrix, as the final warping matrix for stitching the two key frames At step 404, the method 400 allows the frame stitching module 212 to modify the horizontal translation parameter and the vertical translation parameter of the warping matrix based on the final warping matrix and a previous warping matrix to create a modified warping matrix. The previous warping matrix is the warping matrix created during frame stitching of preceding frame. At step 406, the method 400 allows the frame stitching module 212 to stitch the key frame and the consecutive key frame based on the modified warping matrix. At step 408, the method 400 allows the frame stitching module 212 to construct the image of the scene of interest 106 by iterating the stitching of the key frame and the consecutive key frame for all the key frames from the set of key frames, in sequence.

The constrained feature based approach intelligently leverages the coarse level transformation extracted from the IMU data to choose the best warp matrix computed by an image key point matching technique. A major issue arises when there are not enough key point matches found. For example, when the mobile imaging device 104 captured videos for an indoor industrial scenario, this approach has limitations in many cases, due to poor quality of images and redundancy introduced by similar looking boxes. To address, this issue, the selective approach ($A_{sel}$), that chooses between $A_{int}$ and $A_{fea}$. When there are not enough key point matches between two key frames using $A_{fea}$ (key correspondence below the key point threshold), then $A_{int}$ is used. Relying solely on IMU results in error propagation, as seen in FIG. 8 (a). For the selective approach to work well, an error correction by introducing a feedback step is performed. With the feedback loop, each time two key frames are stitched using $A_{fea}$ or $A_{int}$, a final warping matrix $M_{final}$ can be used to correct the IMU based initialization $M_{imu}$. This is implement by introducing a correction term to the IMU-based translation of equation 2.

$$t'_x = t_x + \lambda(M_{final}(1,3) - M_{imu}(1,3)) \quad (7)$$

$$t'_y = t_y + \lambda(M_{final}(2,3) - M_{imu}(2,3)) \quad (8)$$

By including this feedback, the error propagation is restricted to a great extent, resulting in a robust approach for stitching any kind of images. The result of $A_{sel}$ is shown in FIG. 8 (c). This output can be compared with FIG. 8 (a and b), which are outputs of stitching the same set of images using other approaches described ($A_{int}$ and $A_{fea}$).

Figure 9:
FIG. 9 illustrates comparison of existing and proposed frame stitching approach, in accordance with some embodiments of the present disclosure.

FIG. 9 illustrates comparison of existing and proposed frame stitching approach, in accordance with some embodiments of the present disclosure. The frame stitching based image construction proposed is compared with APAP stitching approach the warehouse data to get the shelf stitched images. FIG. 9 shows the outputs of ($A_{sel}$) in FIG. 9 (b) and the APAP in FIG. 9(a) for four shelves. For each shelf, four to seven key frames are extracted for stitching. It can be observed that the APAP performs well when the scene is mostly planar. In highly non planar scenes, it fails to find to a suitable warping. The frame stitching based image construction proposed can be seen to perform reasonably well even in these scenarios.

For quantitative evaluation, peak signal to noise ratio (PSNR) parameter and Structural similarity index (SSIM) are computed. Table 1 displays the values of these metrics for the APAP, the traditional SIFT matching approach and the frame stitching based image construction with and without feedback (as proposed in method 300 and method 400). The results demonstrate that the frame stitching based image construction with and without feedback (as proposed in method 300 and method 400) achieves higher stitched image quality compared to the other stitching algorithms. Also, when the method 300 and the method 400 is implemented in MATLAB, for each shelf the time taken to compute the stitching is approximately 40 seconds, indicating faster computation. Table1 below provides quantitative comparison of the method with APAP algorithm for video stitching of six shelves.

TABLE 1

| Approach | PSNR | SSIM |
|---|---|---|
| APAP | 15.2462 | 0.5099 |
| SIFT | 15.5675 | 0.5228 |
| Method 330 and method 400 ($A_{sel}$) | 17.3452 | 0.6783 |

The method and the image construction system disclosed herein even though is particularly explained in conjunction with the mobile imaging device that captures image frames traversing defined path to cover the entire scene of interest, it can be applied to a scenario having multiple static cameras (imaging devices) provided the camera positions and camera parameters are known, and the frames captured by the different cameras have sufficient overlap. Minor modifications to warping matrix ($M_{imu}$) for initialization may be required, still being within the scope of the disclosed method and image construction system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps of method 300 and method 400 are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented frame stitching based image construction method, the method comprising:
  receiving (302),
    a sequence of a plurality of image frames from a mobile imaging device, wherein the plurality of image frames correspond to a scene of interest in an indoor environment;
    a positional data of the mobile imaging device from an Inertial Measurement Unit (IMU) of the mobile imaging device, wherein the IMU provides change in the positional data corresponding to each image frame among the plurality of image frames; and
    a plurality of device parameters of the mobile imaging device, wherein the plurality of device parameters comprise a horizontal field of view (FoV), a vertical FoV, and frame dimensions of the plurality image frames;
  selecting (304) a set of key frames from the plurality of image frames, wherein the set of key frames comprises an initial key frame identified based on an initial key frame criteria and key frames placed at a predefined distance interval starting from the initial key frame, wherein each key frame from the set of key frames provides a maximum average of luminance and variance;
  stitching (306) the set of key frames to construct an image of the scene of interest, wherein the stitching comprises:
    selecting one key frame and a corresponding consecutive key frame from the set of key frames, wherein the selected key frame is the initial key frame during first iteration of stitching the set of key frames;
    determining a warping matrix between the selected key frame and the corresponding consecutive key frame for initialization during image registration, wherein elements of the warping matrix comprise a horizontal translation parameter and a vertical translation parameter derived from a change in IMU positional data received for each key frame and the plurality of device parameters;
    generating a refined warping matrix from the warping matrix to perform an image intensity based registration refinement;
    estimating a constraint feature based warping matrix to stitch the selected key frame and the corresponding consecutive key frame, wherein the constraint feature based warping matrix is estimated from the refined warping matrix and a plurality of features extracted from a constrained space of the selected key frame and the corresponding consecutive key frame, wherein the extracted plurality of features provide key point correspondence between the selected key frame and the corresponding consecutive key frame; and
  constructing (308) an image of the scene of interest by iterating the stitching of each the key frame of the set of keyframes and the corresponding consecutive key frame of each key frame, in sequence.

2. The processor implemented method of claim 1, wherein the method further comprises applying a selective approach with feedback for the frame stitching based image construction method, where the selective approach with feedback comprises:
  choosing (402) one of:
    the refined warping matrix as a final warping matrix for stitching one key frame and the corresponding consecutive keyframe, if the extracted plurality of features which provide key point correspondence between the key frame and the consecutive key frame are below a key point threshold; and the constrained feature based warping matrix as the final warping matrix for stitching one key frame and the corresponding consecutive keyframe, if the extracted plurality of features providing key point correspondence between the key frame and the consecutive key frame and are above the key point threshold;

modifying (404) the horizontal translation parameter and the vertical translation parameter of the warping matrix based on the final warping matrix and a previous warping matrix to create a modified warping matrix, wherein the previous warping matrix is the warping matrix created during frame stitching of preceding frame;

stitching (406) one key frame and the corresponding consecutive keyframe based on the modified warping matrix; and constructing (408) the image of the scene of interest by iterating the stitching of each key frame from the set of keyframes and the corresponding consecutive key frame, in sequence.

3. The processor implemented method of claim 1, wherein generating the refined warping matrix from the warping matrix comprises applying a gradient decent optimizer and minimization of a mean square error (MSE) metric with transformation set to translation.

4. The processor implemented method of claim 1, wherein the constraint feature based warping matrix is defined by a rotation constraint, a refined warping matrix based horizontal translation constraint, and a refined warping matrix based vertical translation constraint set using the refined warping matrix, wherein the constraint feature based warped matrix provides refinement over the refined warping matrix.

5. An image construction system (102) for frame stitching based image construction, the image construction system (102) comprises:
   a processor (202);
   an Input/Output (I/O) interface (206);
   a memory (204), the memory comprising a frame stitching module (212);
   wherein the frame stitching module (212) is configured to:
   receive,
      a sequence of a plurality of image frames from a mobile imaging device (104), wherein the plurality of image frames correspond to a scene of interest in an indoor environment;
      a positional data of the mobile imaging device (104) from an Inertial Measurement Unit (IMU) of the mobile imaging device (104), wherein the IMU provides change in the positional data corresponding to each image frame among the plurality of image frames; and
      a plurality of device parameters of the mobile imaging device (104), wherein the plurality of device parameters comprise a horizontal field of view (FoV), a vertical FoV and frame dimensions of the plurality image frames;
   select a set of key frames from the plurality of image frames, wherein the set of key frames comprises an initial key frame identified based on an initial key frame criteria and key frames placed at a predefined distance interval starting from the initial key frame, wherein each key frame from the set of key frames provides a maximum average of luminance and variance over a predefined interval defined by number of image frames;
   stitch the set of key frames to construct an image of the scene of interest, wherein to stitch the key frames the frame stitching module (212) is configured to:
      select one key frame and a corresponding consecutive key frame from the set of key frames, wherein the selected key frame is the initial key frame during first iteration of stitching the set of key frames;
      determine a warping matrix between the selected key frame and the corresponding consecutive key frame for initialization during image registration, wherein elements of the warping matrix comprise a horizontal translation parameter and a vertical translation parameter derived from a change in IMU positional data received for each key frame and the plurality of device parameters;
      generate a refined warping matrix from the warping matrix to perform an image intensity based registration refinement;
      estimate a constraint feature based warping matrix to stitch the selected keyframe and the corresponding consecutive key frame, wherein the constraint feature based warping matrix is estimated from the refined warping matrix and a plurality of features extracted from a constrained space of the selected key frame and the corresponding consecutive key frame, wherein the extracted plurality of features provide key point correspondence between the key frame and the consecutive key frame; and
   construct an image of the scene of interest by iterating the stitching of each key frame from the set of key frames and the corresponding consecutive key frame of each key frame, in sequence.

6. The image construction system (102) of claim 5, wherein the frame stitching module (212) is configured to apply a selective approach with feedback for the frame stitching based image construction method, wherein to apply the selective approach with feedback the frame stitching module (212) is configured to:
   choose one of:
      the refined warping matrix as a final warping matrix for stitching the one key frame and the corresponding consecutive keyframes, if the extracted plurality of features which provide key point correspondence between the key frame and the consecutive key frame, are below a key point threshold; and
      the constrained feature based warping matrix as the final warping matrix for stitching one key frame and the corresponding consecutive keyframe, if the extracted plurality of features providing key point correspondence between the key frame and the consecutive key frame are above the key point threshold;
   modify the horizontal translation parameter and the vertical translation parameter of the warping matrix based on the final warping matrix and a previous warping matrix to create a modified warping matrix, wherein the previous warping matrix is the warping matrix created during frame stitching of preceding frame;
   stitch one key frame and the corresponding consecutive keyframe based on the modified warping matrix; and
   construct the image of the scene of interest by iterating the stitching of each key frame from the set of keyframes and the corresponding consecutive key frame, in sequence.

7. The image construction system (102) of claim 5, wherein the frame stitching module (212) is configured to generate the refined warping matrix from the warping matrix comprises applying a gradient decent optimizer and minimization of a mean square error (MSE) metric with transformation set to translation.

8. The image construction system (102) of claim 5, wherein the constraint feature based warping matrix is defined by a rotation constraint, a refined warping matrix based horizontal translation constraint and a refined warping matrix based vertical translation constraint set using the refined warping matrix, wherein the constraint feature based warped matrix provides refinement over the refined warping matrix.

9. One or more non-transitory machine readable information storage mediums comprising one or more instructions which when executed by one or more hardware processors causes the one or more hardware processor to perform a method for frame stitching based image construction, said method comprising:
   receiving (302),
      a sequence of a plurality of image frames from a mobile imaging device, wherein the plurality of image frames correspond to a scene of interest in an indoor environment;
      a positional data of the mobile imaging device from an Inertial Measurement Unit (IMU) of the mobile imaging device, wherein the IMU provides change in the positional data corresponding to each image frame among the plurality of image frames; and
      a plurality of device parameters of the mobile imaging device, wherein the plurality of device parameters comprise a horizontal field of view (FoV), a vertical FoV, and frame dimensions of the plurality image frames;
   selecting (304) a set of key frames from the plurality of image frames, wherein the set of key frames comprises an initial key frame identified based on an initial key frame criteria and key frames placed at a predefined distance interval starting from the initial key frame, wherein each key frame from the set of key frames provides a maximum average of luminance and variance;
   stitching (306) the set of key frames to construct an image of the scene of interest, wherein the stitching comprises:
      selecting one key frame and a corresponding consecutive key frame from the set of key frames, wherein the selected key frame is the initial key frame during first iteration of stitching the set of key frames;
      determining a warping matrix between the selected key frame and the corresponding consecutive key frame for initialization during image registration, wherein elements of the warping matrix comprise a horizontal translation parameter and a vertical translation parameter derived from a change in IMU positional data received for each key frame and the plurality of device parameters;
      generating a refined warping matrix from the warping matrix to perform an image intensity based registration refinement;
      estimating a constraint feature based warping matrix to stitch the selected key frame and the corresponding consecutive key frame, wherein the constraint feature based warping matrix is estimated from the refined warping matrix and a plurality of features extracted from a constrained space of the selected key frame and the corresponding consecutive key frame, wherein the extracted plurality of features provide key point correspondence between the selected key frame and the corresponding consecutive key frame; and
   constructing (308) an image of the scene of interest by iterating the stitching of each the key frame of the set of keyframes and the corresponding consecutive key frame of each key frame, in sequence.

10. The one or more non-transitory machine readable information storage mediums of claim 9, further comprising:
   choosing (402) one of:
      the refined warping matrix as a final warping matrix for stitching one key frame and the corresponding consecutive keyframe, if the extracted plurality of features which provide key point correspondence between the key frame and the consecutive key frame are below a key point threshold; and
      the constrained feature based warping matrix as the final warping matrix for stitching one key frame and the corresponding consecutive keyframe, if the extracted plurality of features providing key point correspondence between the key frame and the consecutive key frame and are above the key point threshold;
   modifying (404) the horizontal translation parameter and the vertical translation parameter of the warping matrix based on the final warping matrix and a previous warping matrix to create a modified warping matrix, wherein the previous warping matrix is the warping matrix created during frame stitching of preceding frame;
   stitching (406) one key frame and the corresponding consecutive keyframe based on the modified warping matrix; and
   constructing (408) the image of the scene of interest by iterating the stitching of each key frame from the set of keyframes and the corresponding consecutive key frame, in sequence.

11. The one or more non-transitory machine readable information storage mediums of claim 9, wherein generating the refined warping matrix from the warping matrix comprises applying a gradient decent optimizer and minimization of a mean square error (MSE) metric with transformation set to translation.

12. The one or more non-transitory machine readable information storage mediums of claim 9, wherein the constraint feature based warping matrix is defined by a rotation constraint, a refined warping matrix based horizontal translation constraint, and a refined warping matrix based vertical translation constraint set using the refined warping matrix, wherein the constraint feature based warped matrix provides refinement over the refined warping matrix.

* * * * *